Jan. 15, 1957  T. H. FORREST  2,777,815
SEWAGE DIGESTION PROCESS
Filed June 8, 1953  2 Sheets-Sheet 2
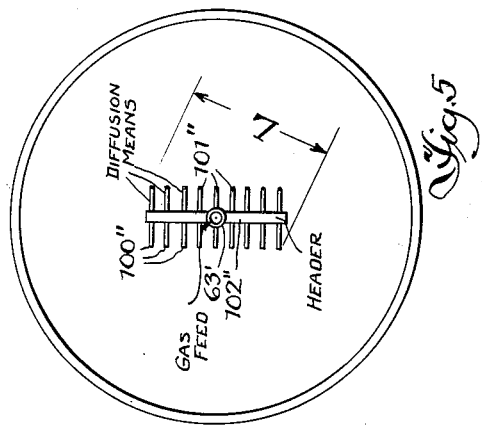
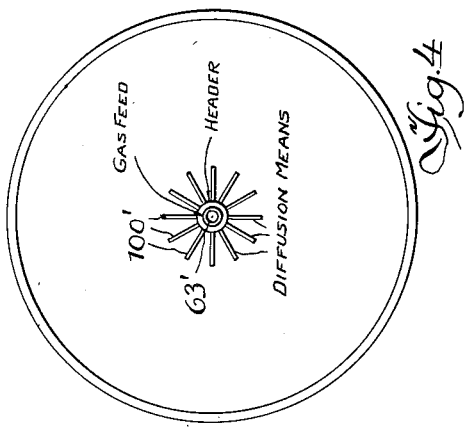
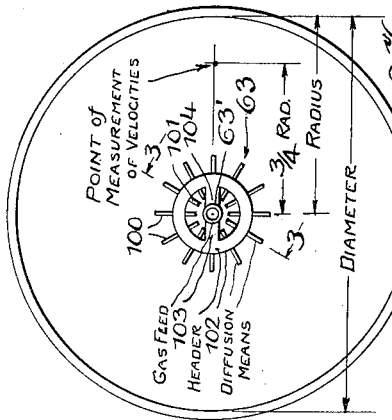
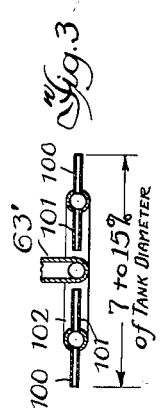
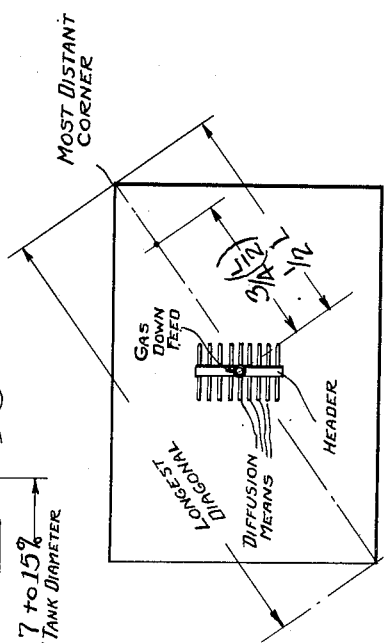
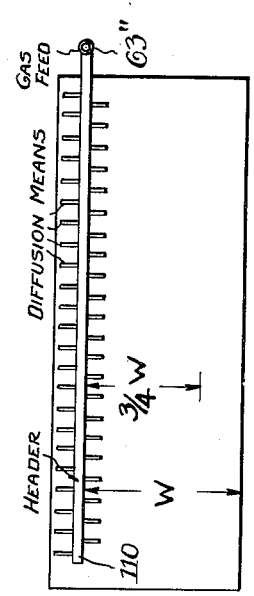
Inventor,
Tom H. Forrest,
By: Schneider & Dressler, Attys.

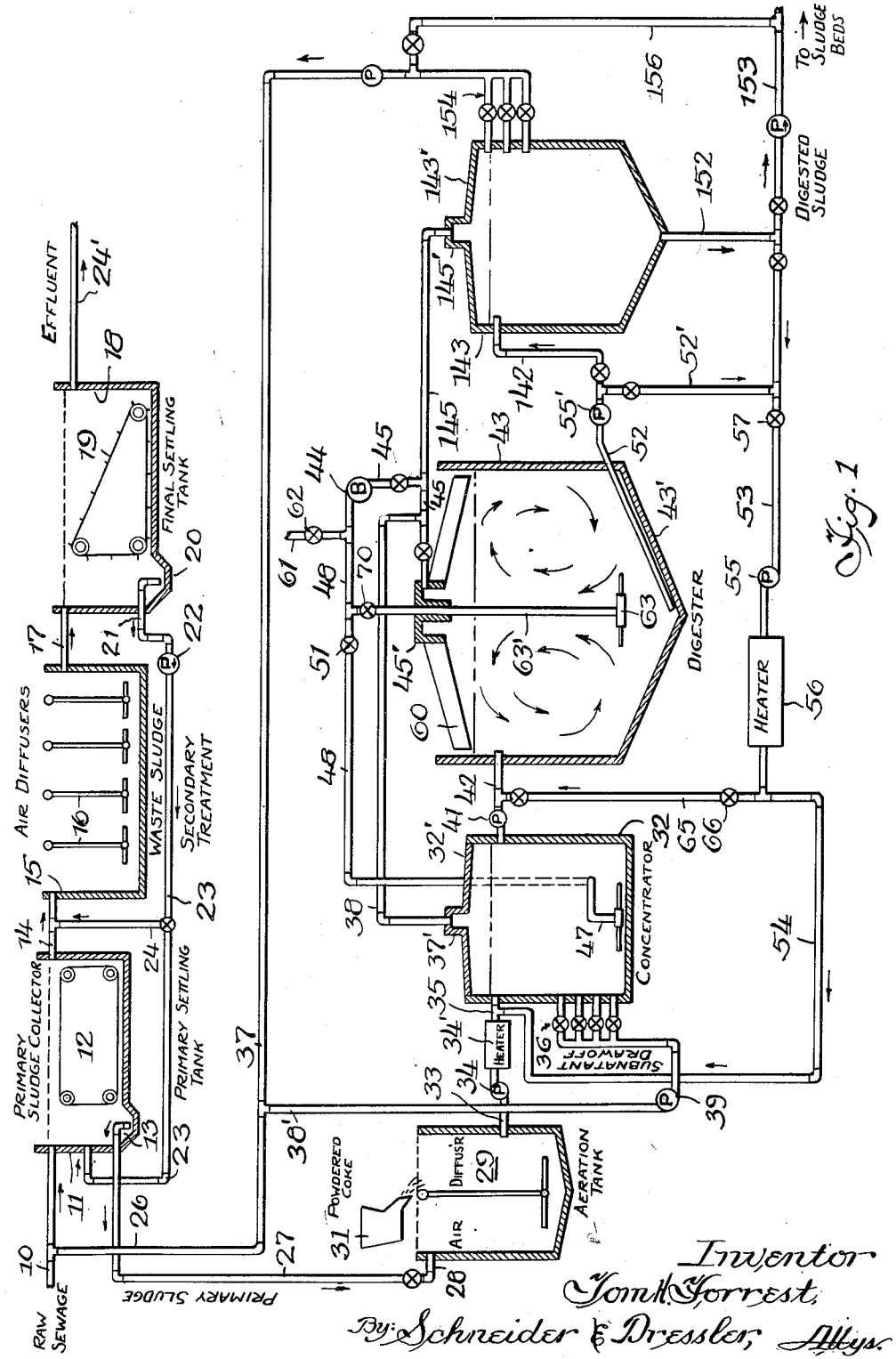

United States Patent Office 2,777,815
Patented Jan. 15, 1957

2,777,815
SEWAGE DIGESTION PROCESS

Tom H. Forrest, Evanston, Ill., assignor to Chicago Pump Company, a corporation of Delaware Application June 8, 1953, Serial No. 360,005

9 Claims. (Cl. 210—2)

The present invention relates to improvements in the treatment of sewage and sewage sludge and more particularly in such treatment wherein anaerobic digestion is employed as a primary factor in effecting the decomposition of the organic materials present in sewage or sewage sludge. Such organic materials may be derived from domestic wastes or from industrial wastes.

The process of anaerobic digestion of sewage or sewage sludge as commercially practiced has been, up to the time of the instant invention, a time consuming process, usually taking thirty days or more to effect a satisfactory decomposition of sewage and sewage sludge. The digestion facilities necessary to handle the sewage of a community of any size has accordingly been extensive and much research has been done in recent years to reduce the period necessary for the anaerobic digestion of sewage and sewage sludge, and thereby reduce the size of apparatus necessary to effect digestion.

Attempts have heretofore been made to effect the acceleration of digestion of sewage sludge by agitating the contents of a tank undergoing anaerobic digestion. In these processes, compressed gases, including gases generated during the digestion process, hereinafter to be referred to as "digester gas," and mechanical agitators were utilized to produce motion in the material undergoing digestion. Such systems are disclosed in German Patent No. 441,851, dated January 20, 1925, and German Patent No. 492,809, dated March 20, 1930.

It was not appreciated by the prior arts workers that contacting the sludge undergoing digestion with digester gas under controlled conditions, whereby both the velocity of movement of the circulating sewage undergoing digestion and the rate at which the digester gas is recirculated in the sludge are held within certain well defined limits, is important to the operation of an anaerobic digestion process on a commercial basis.

We have found that sewage sludge can be digested under anaerobic conditions in a relatively small digestion tank in a commercially feasible operation, by effecting the digestion with the aid of digester gas introduced into the materials undergoing digestion at the rate of about ⅛ to 2 cubic feet per minute per foot of longest horizontal internal cross sectional dimension of the tank and under conditions such that there is established and maintained in the material undergoing digestion a generally circular motion of a velocity of about ½ foot per second to 1½ feet per second, measured in a region located below the surface of the material approximately 10 percent of the depth thereof and at a distance approximately ¾ of the horizontal distance from the center of the region of introduction of the digester gas to the farthest inner dimension of the tank. The digester gas is discharged uniformly into material undergoing digestion, preferably in a diffused state and over an appreciable area of the tank, from a region located preferably in the center and lower third of the tank. The gas rises in an upward direction after discharge. With this controlled discharge of digester gas within the body of sewage sludge undergoing anaerobic digestion, there is effected an accelerated decomposition of the volatile organic constituents of the sewage sludge and the time of digestion of sludge is markedly reduced, from about thirty days of the present commercial digestion process to about ten days and in many cases to about eight days. This process is claimed in copending application Serial No. 360,282, filed June 8, 1953.

In the digestion process disclosed in the aforesaid application, when digestion is completed it is necessary to interrupt the flow of gas in the digestion tank to allow the digested solids to settle to the bottom thereof so that the digested solids may be withdrawn separately from the supernatant liquid remaining in the upper portions of the digestion tank. The separation of the digested solids from the liquid portion of the sludge mixture may take several hours. In order to enhance the efficiency of the digestion process above referred to, it is desirable to provide a system wherein the flow of gas recirculated in the digestion tank is not interrupted. In accordance with the present invention, this result is accomplished by the utilization of a tank, hereinafter to be referred to as a settling tank, to which the digested sludge mixture is fed. The separation of the digested solids from the liquid portions of the sludge mixture therefore takes place in the settling tank and digester gas may then be continuously recirculated in the digestion tank.

The invention will be fully understood from the following description, illustrated by the accompanying drawings in which:

Figure 1 illustrates a sewage treating system embodying the present invention, the parts being shown diagrammatically and in section;

Fig. 2 is a transverse view of a digestion tank, hereinafter to be referred to as a "digester tank" showing only the tank walls and gas diffusing device therein and the various dimensions of the tank on which the limits of digester gas flow rate and velocity of circulation of the material undergoing digestion depend;

Fig. 3 is a vertical cross-sectional view of the diffuser assembly in Fig. 2 taken along section plane 3—3 in Fig. 2;

Figs. 4 and 5 are transverse views through a digester tank of circular cross section showing only the tank wall and modified forms of the gas diffusing device which may be used with the present invention;

Fig. 6 is a diagrammatic view of a digester tank of square or short rectangular cross section illustrated to show the particular dimensions of such a tank on which the limits of digester gas flow rate and the desired velocity of circulation of the material undergoing digestion depend;

Fig. 7 is a diagrammatic view of a digester tank having a long rectangular cross section and a modified form of diffusing device therein; it is illustrated to show the particular dimensions on which the limits of digester gas flow rate and velocity of circulation of the material undergoing digestion depend.

Before describing the novel features of the present invention, the description to follow will deal first with the treatment of the sewage prior to the digestion of the primary or raw sludge in order to show the environment in which the present invention is practiced and thereby to give an overall picture of a workable system incorporating features of the present invention.

Referring more particularly to Fig. 1 of the drawings, the numeral 10 indicates a conduit through which the raw sewage from the sewage system of a small city, amounting to, say, about one million gallons per day, is discharged into the primary settling tank 11. In general, this raw sewage will have been preliminarily subjected to treatment in the customary comminuting and screening devices to break up and/or remove large foreign objects and may also have been passed through a conventional sedimentation tank. These devices being conventional and in common use, are not shown.

The primary settling tank, which is of sufficient capacity to insure an adequate residence time to permit sedimentation of the sludge, is provided with the usual slow moving sludge collector, diagrammatically illustrated and designated by the numeral 12, and with a sump 13 for the collection of the sludge. In a system handling, say, one million gallons of sewage per day, the amount of sludge collected daily in the tank 11 may be, for example, in the order of ten thousand gallons.

The sewage effluent, after removal of the primary sludge, may be further treated for removal of additional sludge or may be disposed of in any suitable manner, as by dilution, by means of trickling filters, or by other suitable means. As illustrated, it may be subjected to aeration to effect the flocculation of additional sludge, which is then permitted to settle and is preferably added to the sludge collected in the primary settling tank. Thus the effluent from the primary settling tank may pass through a conduit 14 to the aeration tank 15, through which the sewage travels slowly while air is forced into and through the sewage by means of the diffusers 16, which are diagrammatically illustrated. These diffusers may be of any suitable type, for example, such as that shown in the United States patents to Lannert, No. 2,328,655, granted September 7, 1943, and Nordell, No. 2,555,201, granted December 5, 1950, or in the copending applications of Lamb, Ser. No. 206,237, filed January 16, 1951, and Klein, Ser. No. 246,854, filed September 15, 1951.

The aerated sewage leaving the tank 15 passes through a conduit 17 into the final settling tank 18, which is of such capacity that the sewage moves slowly through it, permitting settling of the flocculated sludge. This tank is likewise provided with the usual slow moving sludge collector, illustrated diagrammatically and designated by the number 19. The sludge is collected in a sump 20. As is customary, the sludge collected in the sump 20 is withdrawn through pipe 21 by pump 22, which discharges it through the pipe 23 into the primary settling tank 11, where it settles and collects in the sump 13 in admixture with the primary sludge. If desired, a part of the sludge collected in settling tank 18 may be returned through the line 24 to the conduit 14 and the aeration tank 15.

The treated sewage effluent from the settling tank 18 passes out through the effluent conduit 24' for disposal in the usual manner, such as filter beds, or may be handled in any other desired manner.

Instead of being handled in an aeration system of the character illustrated, the sewage effluent leaving the primary settling tank 11 may be disposed of in any other suitable manner; for example, by filtration or, where permissible, by stream dilution. In such case, the sludge collected in primary settling tank 11 will consist entirely of primary or raw sludge, or of such sludge admixed with any ripe sludge that may be deposited from supernatant liquor from the anaerobic digestion of the sludge that may be returned as hereinafter described.

The sludge collected in tank 11 is withdrawn from sump 13 through line 27 by pump 28 and discharged through line 28 into the aeration and mixing tank 29. While the withdrawal of the primary sludge from the tank 11 may be continuous, in ordinary operation, it is generally preferred that it be intermittent. Usually such withdrawal is effected about three times a day, about one-third of the total of the sludge collected per day being removed from tank 11 each time. Thus with a system as hereinbefore referred to, handling approximately 1,000,000 gallons of sewage per day and in which the total collection of sludge is about 10,000 gallons per day, the amount of sludge removed from tank 11 at each time of such removal will, considering normal variations, be in the order of 3,000 to 3,500 gallons. The capacity of the aerating and mixing tank 29 may have an effective volume equal to or greater than the raw sludge pump capacity per minute.

In the aeration tank 29, the sludge is aerated to a certain extent, preferably using air diffusers, of which one is illustrated at 30, these being the same or of the same character as the air diffusers in the aeration tank 15 previously referred to. The amount of air used is in the range of 25% to 100% by volume of the sludge, preferably about 75%. Thus with the amount of sludge being handled per pumping period of about 3,500 gallons, the amount of air introduced would be in the range from 115 to 470 cubic feet and preferably about 350 cubic feet. Depending upon the number of air diffusers used and the capacity of each of the diffusers, the time of retention of the sludge in the aerating and mixing tank may be from 1 to 5 minutes. Thus with diffuser tubes, the proper number of such air diffusers can be selected to furnish air at the approximate rate of raw sludge pumpage through the aeration tank, i. e., at approximately equal volumes.

The mixing of the air with the raw sludge may be carried out at any normal operating temperature above the freezing point, say in the range of from 32° F. to 90° F. The air utilized should be at a temperature of not less than 30° F. and its temperature may be higher, say up to 150° F., and may contribute to maintaining the sludge in the aeration tank 29 above freezing temperature during cold weather.

Upon the completion of the introduction of the desired quantity of air, or preferably slightly before its completion, an adsorptive material may be thoroughly admixed with the sewage sludge and suspended therein. Preferably finely divided coke is employed, the coke being ground sufficiently finely so that the greater portion thereof, say 90%, will pass through a 200 mesh sieve and all of it will pass through a 75 mesh sieve. The powdered coke may be introduced into the aerating and mixing tank 29 in any suitable manner, for example, from the hopper 31. When introduced in the latter stages of the aeration process, the introduction of the air effects the desired admixture of the coke with the sludge. Supplementary mechanical mixing devices may be employed, if desired. As is readily apparent, the powdered coke may also be admixed with the sludge promptly after its aeration or in its flow from the aeration and mixing tank 29 to the concentration tank 32 hereinafter referred to, any suitable mixing means being employed. The aeration of the raw sewage and addition of an adsorptive material, if utilized, should preferably precede rather than follow the concentration process to be described. Other adsorptive materials may be employed instead of powdered coke, such as fuller's earth, silica gel, diatomaceous earth or the like. Coke is, however, preferred. The proportion of finely divided adsorptive material, such as coke, that is added is suitably in the order of 0.5 to 2.5 parts per 100 parts of sludge, by weight, and preferably, in the case of coke, is about 1 part per 100 parts of sludge by weight.

It should be noted that although the preliminary aeration of the raw sludge to undergo digestion is preferred, such aeration may be omitted. The primary operation to be performed in the digestion process of the present invention is one of anaerobic digestion which does not require the presence of oxygen to effect digestion.

Promptly after the aeration of the sludge and its intermixture with the coke or other adsorptive material, the sludge is introduced into the concentration tank 32. The sludge may suitably be withdrawn from the aeration and mixing tank 29 through line 33 by pump 34. The raw sludge entering concentration tank 32 is heated in a suitable heater 34' which may, for example, be similar to the heater disclosed in copending application Serial No. 290,848, on a Method and Apparatus for Treating Sewage Sludge, filed May 31, 1952, by Milton Spiegel and Miles H. Lamb. The temperature to which the raw sludge is heated is not critical, but the sludge is preferably heated to a temperature of from 80° to 100° F.

Although it is preferred to heat the sludge externally of the concentration tank 32 to avoid unnecessary obstruction from heating coils within the concentration tank, such heating may be carried on, if desired, within the concentration tank. In either case, the concentration tank should be insulated to prevent the escape of heat therefrom.

The sludge entering the concentration tank may, for example, consist of from about 3 to 8% by weight of solids out of which 40% to 70% may be volatile solids.

The aerated raw sludge (or the raw sludge, if the aeration step is omitted) in sludge concentration tank 32 is concentrated by being floated to the surface of the mixture therein in a manner to be described. A relatively clarified liquor (subnatant) forms in the bottom of concentration tank 32 as a result of the concentration process, which is drawn off from the lower level of the concentration tank through one or more withdrawal pipes indicated generally by numeral 36. The subnatant may then be discharged into primary settling tank 11 as by pump 39 via lines 38' and 37. The concentrated sludge floating in the upper portion of concentration tank 32 may be suitably withdrawn from this tank by pump 41 and discharged through line 42 to a digester tank 43. This concentrated sludge may include as much as 8% to 12% solids by weight. Concentration tank 32 is preferably of square or circular cross section and includes a cover 32' of the fixed or floating variety, a fixed one being shown, to isolate the contents therein from the atmosphere.

The raw sludge is concentrated in concentration tank 32 as by digester gas fed from a digester tank, such as tank 43, by means of a blower 44 from a gas draw-off line 45 communicating with the gas collecting dome 45' of digester tank 43. The gas passes through line 48 and through a gas diffusing device 47, similar to diffusers 16, located preferably near the bottom and center of the concentration tank 32. The diffusing device 47 should produce a slowly rising column of gas extending over a considerable area. This slowly rising column of gas should not agitate the sewage sludge or impart thereto a circulatory movement.

Diffusing device 47 preferably includes a series of diffusing elements or tubes arranged near the center of the bottom of concentration tank 32. Figs. 2 to 6 illustrate various forms of diffusing devices which may be used in concentration tank 32. These figures will be later described in connection with the description of digester tank 43, wherein diffusing devices 63 similar to diffusing devices 47 are utilized.

Gas in the form of small bubbles rises to the surface of the contents in concentration tank 32 and the solid particles in the raw sludge undergoing concentration are thereby gasified to reduce the density thereof and cause the solid particles to float to the top of the sludge mixture.

Excessive motion of the mixture caused by the flow of digester gas through the sludge in the concentration tank must be prevented or else the solid sludge particles will not remain concentrated at the top of the sludge mixture. The digester gas must therefore be gently circulated through the contents of the concentration tank. To effect this end, the rate of flow of gas through gas diffusing device 47 is kept within the limits of from $\frac{1}{20}$ to $\frac{1}{10}$ of a cubic foot per minute per foot of internal diameter of concentration tank 32, assuming that the concentration tank 32 has a substantially constant circular cross section. With this limited gas flow, sludge particles will be floated to the top of the raw sludge mixture until substantially all of the solid particles in the concentration tank are concentrated as a floating mass on the top of the mixture. A clarified subnatant then remains below the concentrated sludge. If the rate of gas diffusion were increased above about $\frac{1}{10}$ of a cubic foot per minute per foot of tank diameter, there would be excessive turbulence and the solids concentration would not build up. A valve 51 in gas line 48 is provided to control the amount of digester gas fed to concentration tank 32.

Cover 32' of the concentration tank includes a gas collecting dome 37' which communicates with a line 38 leading to the gas-drawoff line 45 of digester tank 43. The gas fed to concentration tank 32 is thus recirculated through the system, resulting in an economical utilization of the gaseous products of digestion.

The above specified concentration process is applicable to concentration tanks having other than circular cross sections if the basis for the desirable gas flow rate is taken, for example, on the basis of the longest diagonal of the horizontal cross section of the concentration tank, assuming that the tank has a constant rectangular cross section. This will be described in more detail hereinafter in connection with the description of digester tank 43 where the rate of flow of gas within the digester tank is also dependent on tank diameter or longest diagonal dimension.

It has also been found that the length of time required to completely concentrate sewage sludge in concentration tank 32 can be materially reduced by introducing digested sludge as seed sludge from digester tank 43 into concentration tank 32. Accordingly a line 54 carries heated digested sludge to the sludge input line 35 of concentration tank 32 where it mixes with the sludge to aid in the concentration process.

The amount of seed sludge which is mixed with the raw sludge carried to concentration tank 32 should be from 2 to 20% of the raw sludge volume in concentration tank 32 at the time of mixing.

The combination of gas concentration and seeding of the concentration tank above described materially reduces the time required to complete concentration from about two days, more or less, to as little as one day. The seeding feature has the further advantage that it increases the volume of subnatant produced by as much as 100%.

The use of seed sludge to improve the concentration of raw sewage has also been found to shorten the time for concentration, when used with other concentration processes such as a flotation process utilizing only heat and time to effect concentration. This is more fully described and is claimed in the copending application of Philip F. Morgan, Serial No. 360,019, filed June 11, 1953.

As previously stated, the concentrated sludge from concentration tank 32 is pumped to the digester tank 43 through line 42 by a suitable pump 41. If desired, gravity feed may be utilized to carry the concentrated sludge to the digester tank. This may be done by locating the inlet to the digester tank below the outlet of concentration tank 32.

In ordinary operation, the digester tank will be filled to its normal operating level with sludge undergoing digestion. Just prior to the introduction of the sludge from the concentration tank, an amount of digested sludge is withdrawn from digester tank 43 equal to the amount of the concentrated sludge to be withdrawn from the upper level of concentration tank 32. A suitable sludge discharge line 52 communicates with the bottom of digester tank 43 and a pump 55' discharge sludge from the digester tank into settling tank 143 where it is held under quiescent conditions. The digested solids then settle to the bottom of the settling tank, leaving a liquid supernatant concentrated in the upper portions of the tank.

The digester tank 43, as illustrated, is a conventional digestion tank for anaerobic digestion of the sludge and is provided with a floating roof 60 having a gas collecting dome 45', which is well known in the art. A fixed roof may be used, if desired. The contents of the digester tank are thereby isolated from the atmosphere.

Gas drawoff line 45 communicates with gas collecting dome 45' and carries the gaseous products of the digestion process to any one of a plurality of locations. Thus, drawoff line 45 may communicate with a line 61 leading to suitable equipment for utilizing such gas, such as gas engines or burners, or to a gas holder. A valve 62 controls the amount of gas carried by line 61. Gas drawoff line 45, as previously stated, communicates with valved line 48 leading to gas diffusing device 47 in concentration tank 32. A branch line 63' extending from line 48 ahead of valve 51 into the digester tank, is provided to recirculate digester gas, by means of blower 44, to the digester tank 43 to effect an accelerated digestion of the sewage sludge in accordance with the present invention. Branch line 63' communicates with a gas diffusing device 63 which is similar to gas diffusing device 47 in concentration tank 32.

Gas diffusing device 63 covers an appreciable area in the bottom, central portion of digester tank 43 so that a large rising column of diffused gas is generated within the sludge undergoing digestion in the digester tank. This causes the sludge to circulate upward in the central portion of the digester tank and then downward along the sides thereof in a generally circular direction, as indicated in Fig. 1. When the quantity of digester gas so recirculated is controlled within the well-defined limits of the present invention, the digestion of the sludge is accelerated to such an extent that the period necessary for complete digestion of sewage sludge is materially reduced from the time presently required, to about ten days and even less.

If an insufficient amount of gas is circulated in the digester tank, the sewage solids tend to accumulate as a floating mass upon the top of the sewage liquid, thereby seriously inhibiting the normal anaerobic digestion of the sewage solids. If the amount of digester gas circulated is greater than the upper limit of the range in accordance with the present invention, excessive turbulence takes place within the tank and the resulting frothing interferes with the desired separation of the digester gas from the material undergoing digestion and with the digestion of the sewage solids.

The rate at which gas is introduced into digester tank 43 to effect the accelerated digestion of the present invention falls within the range of from ⅛ to 2 cubic feet per minute per foot of diameter of the digester tank. This range of gas flow produces a continuous, generally circular movement of the material undergoing digestion at a rate of from ½ foot per second to 1½ (preferably ¾) feet per second, measured at approximately 10% of the depth of the digestion material within the digester tank and a distance of approximately ¾ of the horizontal distance from the center of the region of introduction of the digester gas into the body of the sludge to the farthest inner dimension of the tank. The rate of gas introduction in the above example is such that the total volume recirculated per day is substantially less than that produced per day in the digestion tank. When the digester gas flow rate and resultant velocity of sludge circulation is kept within the defined limits recited, the rate of anaerobic digestion and of decomposition of the volatile or organic constituents of the material undergoing treatment is materially enhanced and accelerated.

Fig. 2 illustrates how to locate the point at which the desired velocity of movement of the sewage in digester tank 43 is measured. This figure shows a horizontal transverse view of a cylindrical digester tank looking downward toward the bottom of the tank. The diffusing device is shown in the center of the tank. The point of measurement is located along a horizontal radial line in a plane 10% of the depth of the sludge in the tank (below the top level of the sludge) and ¾ of the distance from the center of the zone of gas diffusion to the farthest inner wall of the tank. In the embodiment shown, this point is ¾ of the radius of the circular cross section of the tank measured from the center of the tank. When the digester tank has an almost square (or short rectangular) cross section as indicated in Fig. 6, the point to which the desired velocity of movement of the sludge is referred is located along a horizontal line 10% below the surface of the sludge and ¾ of the distance from the center of the diffusing device to the farthest inner dimension of the tank. Where the diffusing device is located in the center of the tank, the point of velocity measurement is ¾ of the tank diagonal measured from the center of the tank. A short rectangular tank is either a square tank or a tank which is only slightly longer than it is wide. A long rectangular tank is one in which the length of the tank is at least twice its width. Thus, considering the tanks shown in Figs. 6 and 7 to be drawn to scale, the tank shown in Fig. 6 would be considered to be a "short rectangular tank" while the long and narrow rectangular tank shown in Fig. 7 would be considered to be a "long rectangular tank."

In the case where the diffusing device is located along the side of a digester tank of either circular or generally square cross section, the point of reference for velocity measurement is located substantially at the same point as indicated in Fig. 6, namely, a point located in a plane 10% below the surface of the sludge and ¾ of the distance from the center of the diffusing device to the farthest inner dimension of the tank.

Where the digester tank is of a long rectangular cross section as shown in Fig. 7, the basis for velocity measurement must be modified somewhat. In this example, the diffuser device extends parallel to the long dimension of the tank and along one side thereof. The point of reference for measuring velocity is ¾ of the distance from the central portion of the diffuser device to the opposite wall.

The basis for determining the rate of introduction of gas in a circular tank is the inner diameter of the tank. The basis for determining the rate at which gas is introduced in a tank having a square or rectangular cross section is indicated in Fig. 6. It is the horizontal diagonal of the rectangle formed by the inner walls of the tank. Likewise, the diagonal of the tank in the embodiment of Fig. 7 is the basis for determining the gas flow rate in this embodiment. The basis for determining the gas rate for the concentration tank 32 is similarly figured.

As previously stated, the gas should be diffused over an appreciable area in the center region of the digester tank. Where the diffusing device is generally circular in form, as shown in Figs. 2 to 4, the diffuser device should be of a size to produce preferably a uniform column of gas having a diameter of about 7% to 15% of the tank diameter, in the case of a circular tank, and about 7% to 15% of the longest diagonal of a square or short rectangular tank.

Where the diffusing device is generally rectangular in form, as shown in Fig. 5, the diagonal L of the rectangle outlining the diffusing device should again be about 7% to 15% of the diameter of the tank in the case of a circular tank, and about 7% to 15% of the longest diagonal in the case of a square or short rectangular tank.

Where the diffusing device is placed along the side of a digester tank, the diffusing device should have substantially the same dimensions as when it is placed in the center of the tank. The center location of the diffusing device is clearly preferred, however, since it is a more efficient arrangement. A greater mixing of gas and sludge is effected with a given quantity of gas in such case. The quantity of gas required in a given installation utilizing gas diffusion along the side of the digester tank is somewhat greater than when gas diffusion takes place in the central portion of a digester tank.

The size of the diffusing device 47 in the concentration tank 32 should be at least as large or larger than the diffusing device used in the same size digester tank.

The diffusing device in both the concentration and digester tanks is preferably located in the lower third of the tank (including depth of hopper, if any) and at least a few feet off the bottom of the tank.

A suitable valve 70 in gas line 63' is provided to control the amount of digester gas recirculated to the digester tank 43.

The temperature of the sewage undergoing digestion should be maintained at a desired level, for example, from about 80° to 100° F., preferably 95° F. Suitable heating coils (not shown) may be provided within digester tank 43 to maintain the temperature of the digesting sludge at such temperature. However, it is preferable to heat the sludge with a heating device located outside of digester tank 43 and thereby eliminate the necessity of draining the digester tank to service the heating coils. An external heating device makes it possible to control the sludge temperature with a minimum of variation from top to bottom of the digester tank, and eliminates cold zones in the digester tank which retard digesting. Additionally, unlike heating coils within the digester tank, it does not interfere with the free circulation of sludge within the tank.

As shown, the sludge within the digester tank may be circulated through an external heater. This may be done periodically. Thus, sludge drawoff line 52 communicates with lines 52' and 53 in which heater 56 is located to heat the sludge from the digester tank. Valve 57 in line 53 controls the amount of sludge fed to heater 56. A pump 55 in line 53 circulates the sludge from the digester tank through heater 56 and back into the digester tank through valve 66 and line 65.

Heater 56 may be of any suitable variety, for example, the heater disclosed in the aforesaid copending application Serial No. 290,848. Valve 57 in line 53 and valve 66 in sludge return line 65 control the rate at which the sludge is recirculated to digester tank 43. Some of the sludge which passes through heater 56 may also be directed to concentration tank 32 to aid in concentration of the sewage sludge prior to digestion, as above explained.

Gas diffusing device 63 in digester tank 43 may take any number of forms, as indicated in Figs. 2 through 7. The detailed construction of the diffuser elements or tubes making up each diffusing device are not disclosed herein. They may have any construction. For example, they may be similar to the diffuser tubes described in the aforesaid Nordell Patent 2,555,201, or the aforesaid Lamb application Serial No. 206,237, or the Klein application Serial No. 246,854.

The diffusing device shown in Fig. 2 comprises a plurality of pairs of diffusing elements or tubes 100 and 101 extending from opposite sides of a ring-shaped header 102 about the periphery thereof. Gas line 63', extending vertically within digester tank 43, communicates with ring header 102 through suitable communicating lines 103 and 104. Diffusing elements 100 and 101 provide a rising cylindrical column of gas extending over a considerable portion of the digester tank.

A modification of the generally circular-shaped diffusing device of Figs. 2 and 3 is shown in Fig. 4 wherein the plurality of radially extending diffusing tube elements 100' extend radially from an enlarged portion of gas line 63'. In this modification, diffusing elements 100' extend only outward from the enlarged portion of gas line 63'.

In Fig. 5 the gas diffusing device comprises a plurality of parallel pairs of diffusing elements 100" and 101" which project outwardly from a central header line 102". Gas line 63' communicates with the center of gas header 102". This diffusing device produces a column of gas of rectangular cross section within the digester tank.

The diffusing device shown in Fig. 6 is identical to the diffusing device shown in Fig. 5 except that it is shown within a tank of short rectangular cross section.

Although for best results it is preferred to place the diffusing device in the central portion of the digester tank, the diffusing device may also be placed along one side of the digester tank as shown in Fig. 7, where a tank of long rectangular cross section is illustrated. The diffusing device shown in Fig. 7 includes a main header 110 from which extends a series of diffusing elements alternately from opposite sides of header 110. Gas feed line 63" communicates with one end of gas header 110.

Where the gas diffusing device is placed along the bottom and side of the digester tank, an upward movement of sludge is effected above the diffusing device and a downward movement of sludge is effected on the opposite side of the tank from the diffusing device, thereby establishing and maintaining the desired generally circular motion of the sludge.

The number and size of the concentration and digester tanks used in the present invention may be varied to suit the particular needs of the situation. The ranges of rate of gas flow and velocity of movement of the sludge at a particular point are in part dependent on the utilization of tanks having a substantially uniform cross section. If a tank having a widely varying cross section is used, then the gas flow rate and velocity figures may need to be adjusted somewhat. Economical and other considerations favor the use of tanks having a substantially uniform cross section. Digester tanks are generally of uniform cross section except for the sludge collection hopper where one is provided, as the hopper 43' in digester tank 43. The walls of a hopper incline downward from the sides of the tank to the center thereof. The gas flow rate and velocity determinations are based on the cross-sectional dimensions of the main or upper portion of the tank which overlies the hopper.

The ratio of height to width of the concentration and digester tanks may vary widely. For example, ratios of from 1:1 to 1:6 may be used, although a 1:4 ratio is preferred.

One exemplary embodiment of a digester tank installation is as follows:

| | |
|---|---|
| Tank diameter (inner diam. of circular tank)_ _ _ft_ _ | 70 |
| Tank depth (exclusive of hopper)_ _ _ _ _ _ _ _ft_ _ | 25 |
| Hopper depth_ _ _ _ _ _ _ _ _ _ _ _ _ _ _ _ _ _ _ft_ _ | 4 |
| Depth of sludge_ _ _ _ _ _ _ _ _ _ _ _ _ _ _ _ _ft_ _ | 29 |
| Depth of diffusing device from top of sludge_ _ _ft_ _ | 24 |
| Diameter of diffusing device (circular arrangement of Fig. 4)_ _ _ _ _ _ _ _ _ _ _ _ _ _ _ _ _ _ft_ _ | 5¾ |
| Total rate of gas flow_ _ _ _ _ _ _ _ _cu. ft./min_ _ | 70 to 90 |

The same size installation as above described may be used for concentration tank 32. The gas rate, however, would be lower than that used for digestion, as for example, 5 cubic ft./min.

As previously stated, digester tank 43 is utilized to completely digest the sludge housed therein. When the sludge in digester tank 43 has been digested, the sludge is withdrawn through sludge drawoff line 52 by pump 55' and is discharged into the settling tank 143 through line 142.

Settling tank 143 may be of any suitable shape, but is preferably circular or rectangular in cross section. A cover 143' of either the fixed or floating variety is provided which includes a conventional gas collecting dome 145'. Gas drawoff line 145 communicates with gas collecting dome 145' to draw off any gases which may accumulate within the settling tank 143. Gas drawoff line 145 communicates with line 45 which connects with lines 48 and 63' leading to gas diffusing devices 63 and 47 in digester tank 43 and concentration tank 32. In this manner, the gases accumulating in settling tank 143 are efficiently utilized in the digestion process.

The digested sludge which settles on the bottom of settling tank 143 is drawn off through a sludge drawoff line 152 communicating with the bottom of the settling tank. The digested sludge may be then fed via line 153 to sludge drying beds and/or may be carried to the influent line 42 of digester tank 43 via lines 53 and 65, where the digested solids are mixed with the incoming undigested sludge to the digester tank to seed same and further enhance the digestion process. Preferably from one-half to five volumes of seed sludge would be added to every volume of raw sludge pumped to digester tank 43.

Some of the digested sludge may also be utilized for seeding the contents of concentration tank 32 as above explained. Whether the sludge is utilized to seed the concentration tank contents or the digester tank contents, it is desirable to heat seed sludge to the approximate temperature utilized in these respective processes. Accordingly, heater 56 in line 53 receives sludge carried from the bottom of settling tank 143 to heat same to a suitable temperature.

The supernatant liquid which concentrates in the upper portion of settling tank 143 may be suitably withdrawn by one or more withdrawal lines indicated generally by reference numeral 154 and directed through line 37 leading to primary settling tank 11, or to sludge beds through lines 156 and 153.

Settling tank 143 should preferably contain suitable collection thickening equipment not shown. Since this type of equipment is well known in the art the details of such equipment will not be disclosed herein.

The volume of settling tank 143 should be suitable for providing a detention period of not to exceed twenty-four hours, wherein the digested sludge is held in a quiescent state to allow the digested solids to settle to the bottom thereof. The rate of flow of digested sludge through the settling tank should preferably be equal to the volume of the raw sludge pumped to the digester daily.

The digestion process is considered complete when judged by either one of the following standards. Digestion is complete when 7½ to 10 cubic ft. of gas per pound of volatile solids in the sludge added to the digester is evolved or when the volatile solids are reduced 40% to 50% by weight. On either of these standards, sewage sludge may be digested by the process of the present invention in about ten days. On the same standards, the digestion of sewage sludge as it is generally being carried out commercially, takes about thirty days.

While reference in the preceding description has been made to the recirculation of digester gas, it has been found that similar results may be secured by the introduction into the digester tank of substantially pure methane in amounts corresponding to 50 to 75% of the amounts of digester gas hereinbefore referred to. Other methane-containing gases, such as natural gas, for example, may also be employed in amounts sufficient to provide equivalent quantities of methane gas. In such case, the proportions of sulfur compounds, aromatic hydrocarbons, carbon monoxide and other undesirable constituents in the gas used should be controlled to such an extent as not to impair the effective action of the active organisms in the digestion process. Thus, natural gas which has been treated with the customary reagents for sulfur removal so as to make the gas suitable for use for synthesis gas may be employed in the present process.

In the preceding description, reference has been made to the addition of coke or other adsorptive material to the sludge in preparing it for introduction into the digester tank when operating in accordance with the present process. If desired, the use of the coke or other adsorptive material may be omitted from the process. The adsorptive material, however, appears to exercise a highly beneficial action in providing in admixture with the sludge a material capable of adsorbing the gas and distributing its effectiveness over a longer period of time, which is of particular benefit when the gas is intermittently introduced. The coke or other adsorptive material likewise appears to aid the recirculated gas or methane-containing gas in accelerating the digestion process, possibly by providing nuclei or centers for the propagation of the organisms involved and their effective fermentative action. Coke has been found to be particularly effective in its cooperation with the methane or methane-containing gas in improving and accelerating the digestion process.

If desired, the step of aerating the sludge in preparing it for introduction into the digester tank may likewise be eliminated. The aeration of the sludge to the extent hereinbefore set forth, however, appears to aid in accelerating the digestion and decomposition taking place in the digester tank in accordance with the present invention. The reasons therefore are not understood at this time.

Also, the concentration tank 32 may be omitted from the system if concentration of the sludge is not desired.

By the term "digester gas" or "methane-containing gas," as used herein, is meant gases including methane as the active constituent in proportions of from about 10% to 15% to 100% and preferably 50% to 70%, the remaining constituents being inert or in proportions innocuous to the organisms active in the digestion process. The remaining constituents of the gas may thus be carbon dioxide, nitrogen, helium, hydrogen, ethane, propane or mixtures thereof. Since the organisms involved are anaerobic, the presence of oxygen should be avoided, although minor proportions, say in the order of 1 or 2% may be tolerated.

I claim:

1. In the anaerobic digestion of sewage sludge, the improvement comprising the steps of continuously circulating methane-containing digester gas within an enclosed container containing sludge undergoing digestion to digest the sludge, removing at least a portion of the digested sludge from said container and introducing the same into a second container, and holding the digested sludge in said second container in a quiescent state to enable the digested solids to settle to the bottom thereof, the removal of the digested sludge from said first mentioned container being effected without interruption of the flow of digester gas within said first mentioned container.

2. The method of claim 1 wherein said gas is circulated in said first mentioned container at a sufficient rate to thoroughly intermix the digester gas within the sludge contents of said container.

3. The method of claim 1 wherein the rate of recirculation of said digester gas within said first mentioned container is from one-eighth to two cubic feet per minute per foot of longest horizontal internal cross-sectional dimension of said container.

4. In the anaerobic digestion of sewage sludge wherein methane-containing digester gas is recirculated within an enclosed container containing the sludge undergoing digestion to digest the sludge, the improvement comprising removing portions of the digested sludge from within said container without the interruption of the flow of digester gas therein, and then introducing said removed sludge to a second container and maintaining it therein in a quiescent state to enable the digested solids in said sludge to settle to the bottom of said container.

5. In the anaerobic digestion of sewage sludge wherein methane-containing digester gas is circulated within an enclosed container containing the sludge undergoing digestion to digest the sludge, the improvement comprising removing at least a portion of the digested sludge from said container without the interruption of the flow of digester gas within said container, introducing said removed sludge to a second container, maintaining it therein in a quiescent state to enable the digested solids to settle to the bottom of said last mentioned container, and then withdrawing a portion of the digested solids from the bottom of said last mentioned container and mixing same with sludge in said first mentioned container to accelerate the digestion process therein.

6. The method of claim 5 wherein the amount of digested solids mixed with the sludge undergoing digestion in said first mentioned container is from one-half to five volumes of the digested solids for every volume of sludge to which it is added.

7. In the anaerobic digestion of sewage sludge, the improvement comprising the steps of continuously circulating methane-containing "B" digester gas within an enclosed container containing sludge undergoing digestion to digest the sludge, removing at least a portion of the digested sludge from said container and introducing the same into a second container, and holding the digested sludge in said second container in a quiescent state to enable the digested solids to settle to the bottom thereof, the removal of the digested sludge from said first mentioned container being effected without interruption of the flow of digester gas within said first mentioned container, removing the gas accumulating in said second mentioned container and feeding the same into said first mentioned container to aid in the digestion of the sludge contained therein.

8. In the anaerobic digestion of sewage sludge wherein methane-containing digester gas is recirculated within an enclosed container containing the sludge undergoing digestion to digest the sludge, the improvement comprising removing portions of the digested sludge from within said container without the interruption of the flow of digester gas during the removal, introducing said removed sludge to a second container and maintaining it therein in a quiescent state to enable the digested solids in said sludge to settle to the bottom of said second container, and removing settled solids from said second container.

9. In the anaerobic digestion of sewage sludge within an enclosed container of circular cross-section, the process comprising introducing methane-containing digester gas within the body of said sludge from a region in the center and lower third of said container, at a rate of from one-eighth to two cubic feet per minute per foot of diameter of said container, to digest the sludge, removing portions of the digested sludge from within said container without the interruption of the flow of digester gas during the removal, introducing said removed sludge to a second container and maintaining it therein in a quiescent state to enable the digested solids in said sludge to settle to the bottom of said second container, and removing settled solids from said second container.

References Cited in the file of this patent

UNITED STATES PATENTS

| | | |
|---|---|---|
| 1,820,976 | Imhoff | Sept. 1, 1931 |
| 2,190,598 | Fischer | Feb. 13, 1940 |
| 2,528,649 | Genter et al. | Nov. 7, 1950 |
| 2,638,444 | Kappe | May 12, 1953 |
| 2,640,027 | McNamee et al. | May 26, 1953 |